United States Patent [19]

Baldwin

[11] Patent Number: 4,581,584
[45] Date of Patent: Apr. 8, 1986

[54] MICROWAVE ELECTROMAGNETIC BOREHOLE DIPMETER

[75] Inventor: Willett F. Baldwin, Dallas, Tex.

[73] Assignee: Mobil Oil Corporation, New York, N.Y.

[21] Appl. No.: 576,973

[22] Filed: Feb. 3, 1984

[51] Int. Cl.⁴ .............................................. G01V 3/30
[52] U.S. Cl. ................................... 324/338; 324/337; 343/5 R
[58] Field of Search ............... 324/337, 338; 343/5 R, 343/5 DD, 5 SW, 6 R

[56] References Cited

U.S. PATENT DOCUMENTS

| | | | |
|---|---|---|---|
| 2,455,941 | 12/1948 | Muskat et al. | 324/338 |
| 2,963,641 | 12/1960 | Nanz | 324/376 |
| 3,388,323 | 6/1968 | Stripling | 324/8 |
| 3,404,396 | 10/1968 | Buehler et al. | 343/5 R |
| 3,849,721 | 11/1974 | Calvert | 324/6 |
| 3,944,910 | 3/1976 | Rau | 324/6 |
| 4,107,597 | 8/1978 | Meador et al. | 324/6 |
| 4,381,544 | 4/1983 | Stamm | 324/337 X |
| 4,383,220 | 5/1983 | Baldwin | 324/338 |
| 4,511,842 | 4/1985 | Moran et al. | 324/338 |

OTHER PUBLICATIONS

"Electromagnetic Propagation . . . A New Dimension in Logging", Society of Petroleum Engineers of AIME, Paper No. SPE 6542, by T. J. Calvert and R. N. Rau, 1977.

*Primary Examiner*—Gerard R. Strecker
*Attorney, Agent, or Firm*—A. J. McKillop; Michael G. Gilman; George W. Hager, Jr.

[57] ABSTRACT

A borehole logging tool includes three microwave antennas positioned from the longitudinal axis of the tool and spaced approximately equally around the axis. Microwave energy from a pulsed source is applied to the antennas during a plurality of microwave transmission periods. During a plurality of microwave reception periods, the amplitudes and the phases of the microwave energies received by the three antennas are measured for use in the determination of the dip of the formations surrounding the borehole.

3 Claims, 4 Drawing Figures

MICROWAVE ELECTROMAGNETIC BOREHOLE DIPMETER

BACKGROUND OF THE INVENTION

This invention relates to a system and method for determining the dip of subsurface formations penetrated by a borehole. More particularly, this invention is directed to an apparatus and method that uses electromagnetic energy to determine a dip of subsurface formations penetrated by a borehole.

A discussion of the determination of dip of subsurface formations and of dipmeters is found in FORMATION EVALUATION by Edward J. Lynch, Harper & Row, Publishers, New York, Evanston and London, beginning at page 341. It is there pointed out that the problem of the determination of formation dip evolves into one of locating three points within a depositional layer with reference to a horizontal plane such that a plane is defined by the three points and the angle of dip is that angle between this plane and the horizontal plane. Instruments have been used which can record three electric logs properly spaced and oriented in a single borehole to determine the dip of the subsurface formations penetrated by the borehole. These instruments require an accurate directional survey of the borehole. Wireline dipmeters which are commonly used for this purpose must make three basic measurements. The first is the measurement of dip of the formation relative to the borehole. This has been done by including identical sets of electrodes spaced at 120° and all on the same plane perpendicular to the axis of the tool. The second is a measurement of the direction and angle of inclination of the borehole, and the third is a measurement of the orientation of the tool relative to magnetic north.

Early dipmeters used three SP curves to get the dip relative to the hole axis and used a photoclinometer to determine the hole inclination and direction. A continuous type of dipmeter later introduced employs three microlog devices to make the three required electrical logs. The microdevices are always pressed against the wall of the borehole, thus causing the spacing between them to change as the size of the borehole changes. This necessitates the recording of the borehole size.

In U.S. Pat. No. 3,388,323 to Allen A. Stripling, there is described a technique which has become known as "induction logging" for determining dip of subsurface formations. Two independent parameters indicative of magnetic susceptibility and electrical conductivity or resistivity are derived from magnetic field measurements carried out at three angular positions adjacent a borehole wall. Three coils are employed for carrying out the borehole measurements. These coils are energized to generate magnetic fields at three angular regions around the borehole wall, and the outputs thereof are phase separated into magnetic susceptibility and resistivity measurements. A 10,000-cycle-per-second oscillator and 1,000-cycle-per-second oscillator are employed for energizing the coils. These high- and low-frequency oscillators are employed to increase the sensitivity of the coil to changes in electrical conductivity and magnetic susceptibility.

In a paper entitled "ELECTROMAGNETIC PROPAGATION . . . A New Dimension in Logging" by Thomas J. Calvert, Rama N. Rau, and Larry E. Wells, prepared for presentation at the 1977 47th Annual California Regional Meeting of the Society of Petroleum Engineers of AIME in Bakersfield, Calif., Apr. 13–15, 1977, there is described the operating principles of a well logging tool that measures the phase shift and attenuation of microwave-frequency energy propagated through the formations near a borehole. Also described is an interpretation method for deriving from these measurements the values of porosity and water saturation of earth formations. It is pointed out that this tool is most accurate in fresh water. It is further pointed out at page 15 that the tool is designed for fresh-mud applications and that signal levels may be too low in salt muds and signals are not reliable in oil- or gas-filled boreholes.

Logging techniques using electromagnetic energy are described in U.S. Pat. No. 3,849,721 to Thomas J. Calvert; U.S. Pat. No. 3,944,910 to Rama N. Rau; U.S. Pat. No. 4,107,597 to Meader et. al; and U.S. Pat. No. 3,944,910 to Rama N. Rau; U.S. Pat. No. 4,383,220 to Baldwin.

In the U.S. patent to Baldwin a borehole tool is provided that is adapted for moving through the borehole and that has at least three antenna arrays positioned approximately equally around the longitudinal axis of the tool. Each antenna array has one transmitting antenna and one receiving antenna spaced longitudinally one from the other. The tool is adapted for supporting and positioning the antenna arrays against the wall of the borehole. The tool further includes means for simultaneously supplying electromagnetic energy to each of the transmitting antennas for transmitting microwaves electromagnetic energy into the earth formations. Further provided are means coupled to each of the receiving antennas for detecting the signal received by each receiving antenna.

SUMMARY OF THE INVENTION

The present invention is directed to a system for determining the dip of subsurface earth formations penetrated by a borehole. A borehole logging tool adapted for movement through the borehole includes at least three microwave antennas positioned from the longitudinal axis of the tool and spaced approximately equally around the longitudinal axis. The antennas are operated so as to alternately transmit microwave energy into the formations surrounding the borehole and receive microwave energy returning to the borehole from such formations. Microwave transmitting means applies pulsed microwave energy to the three microwave antennas during a plurality of transmission periods. Switching means inhibits microwave energy being applied to the antennas during the transmission periods from also being applied to microwave receiving means, and enables microwave energy being received by the antennas during the plurality of microwave reception periods to be applied to the receiving means. The amplitudes and phases of the received microwave energy signals are measured by the receiving means for use in the determination of the dip of the formations surrounding the borehole.

More particularly, the switching means includes a pair of high frequency diodes connected back-to-back in a parallel manner across the input to the receiving means. The high energy transmitted microwave signals cause these diodes to break down and short circuit the input to the receiving means during the transmission periods. The lower energy level of the received microwave energy signals does not cause break down of the diodes and the received signals are therefore applied to the receiving means during the reception period.

DESCRIPTION OF THE PREFERRED EMBODIMENTS

This invention is directed to a system and method for determining the dip of subsurface earth formations penetrated by a borehole. The system is comprised of a borehole dipmeter which utilizes microwave electromagnetic energy for determining the dip of subsurface earth formations that are penetrated by a borehole.

The overall general appearance of the microwave electromagnetic dipmeter is quite similar to conventional dipmeters. An elongated borehole tool is provided that is adapted for movement through the borehole. A multiconductor logging cable containing electrical conductors for transmitting electrical signals intermediate the surface of the earth and the borehole tool connects with the borehole tool and provides for lowering and raising the tool in the borehole. In operation, the logging cable extends to a means such as a reel for lowering and raising the tool in the borehole. The borehole tool includes at least three antenna arrays positioned from the longitudinal axis of the tool and spaced approximately equally around the axis, approximately 120° one from the other. More than three antenna arrays may be included but three are normally sufficient. Therefore, for simplicity of description, this tool will hereafter be described as having three antenna arrays. The tool is adapted for supporting and positioning the three antenna arrays against the wall of the borehole. A means is provided for simultaneously supplying microwave electromagnetic energy of a frequency within the range of 1.0 to 3.0 gigahertz (GHz) to each of the antennas for transmitting microwave energy into the earth formations. Such microwave energy may be pulsed or any type of periodic transmission. The antennas have coupled thereto means for detecting the microwave energy signals received by the antenna between the pulsed or periodic transmissions. The means for detecting the received signals includes a means for determining both the amplitudes of the received signals and for determining the phases of the received signals as compared to the transmitted signals.

Figure 1:
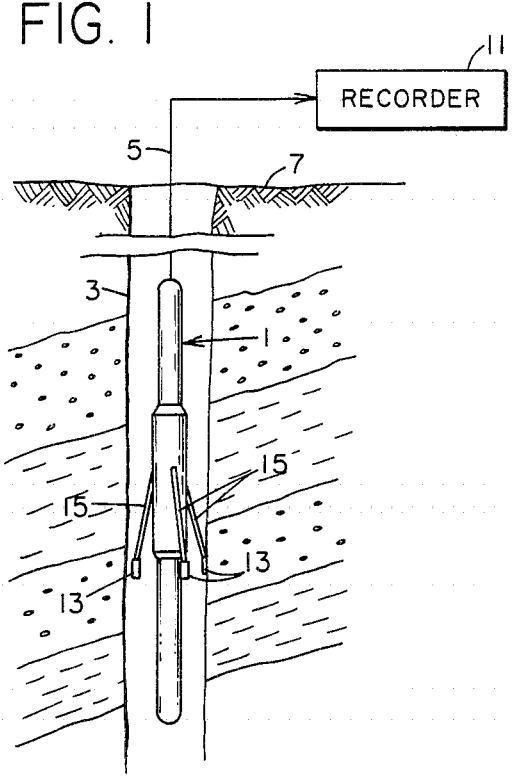
FIG. 1 is a schematic drawing illustrating the system for determining dip of subsurface formations located in a borehole.

The invention is now described in more detail by reference to the drawings. In FIG. 1 there is schematically shown an electromagnetic dipmeter 1 supported in a borehole 3 by a multiconductor logging cable 5 which extends from the electromagnetic borehole dipmeter 1 to the surface 7 of the earth. The multiconductor cable 5 is illustrated connecting with a recorder 11 for recording signals received by the electromagnetic dipmeter 1. The electromagnetic dipmeter 1 includes a least three pads 13 comprised of antennas spaced approximately equally around the longitudinal axis of the dipmeter 1. The pads desirably are aligned along a horizontal plane which passes perpendicular through the longitudinal axis of the dipmeter 1. The pads 13 are adapted for being supported by the dipmeter 1 and positioned against the wall of the borehole 3. Support means 15 may be provided to support the pads 13. The dipmeter 1 also includes other conventional means for determining and transmitting to the surface of the earth such information as the size or caliper of the borehole, the deviation of the borehole from the vertical, the relative bearing of the borehole to the pads, and the compass bearing or azimuth of the pads.

Figure 2A:
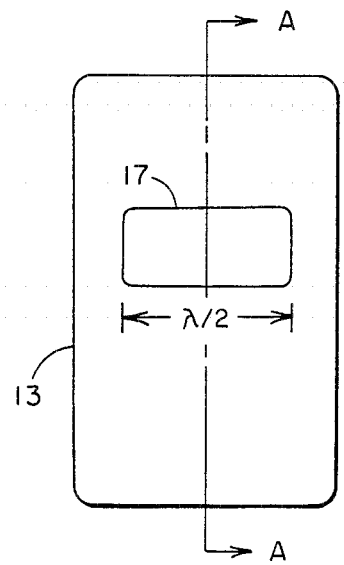
FIGS. 2A and 2B are schematic views of a pad for housing each of the antennas of FIG. 1.
Figure 2B:
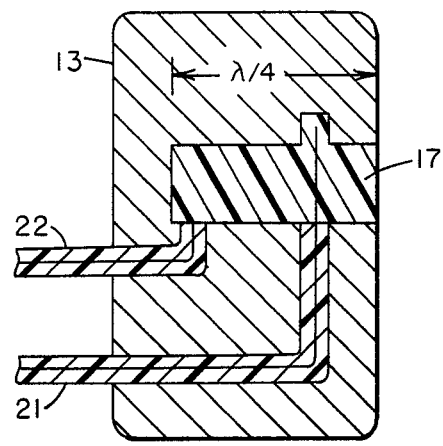
Figure 3:
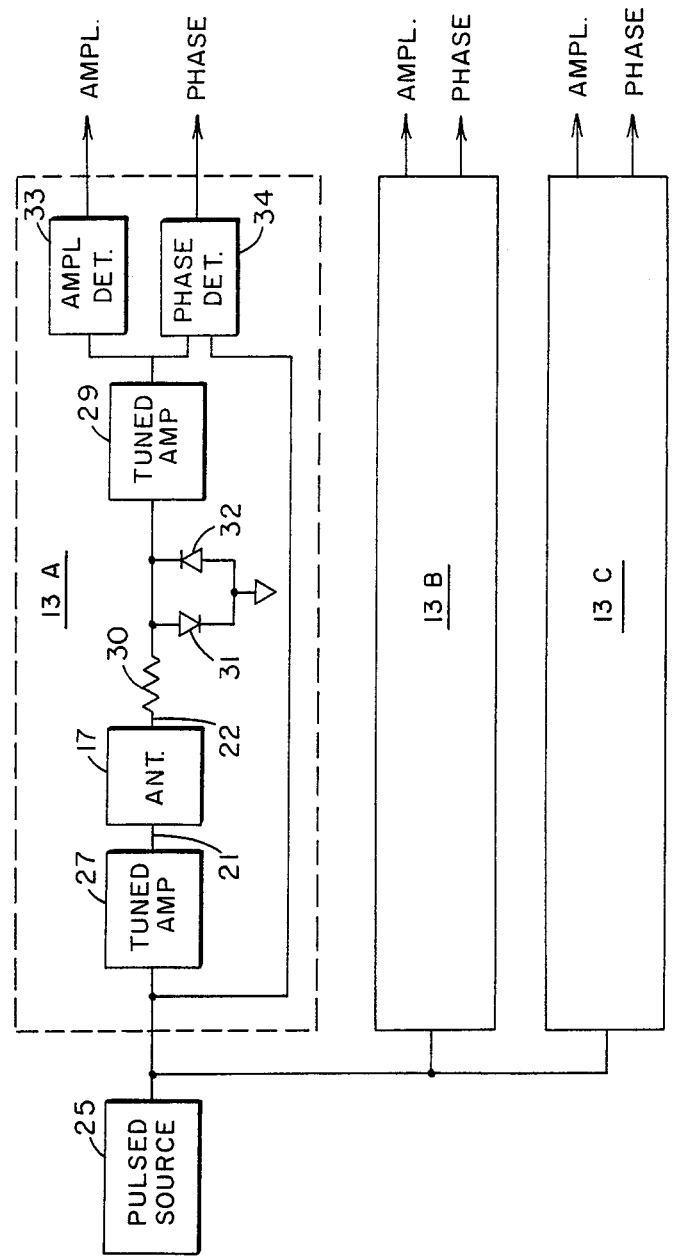
FIG. 3 is an electronic block diagram illustrating the transmitting and receiving systems associated with each of the antennas of FIG. 1.

The pad 13 may be of any type suitable for transmitting and receiving microwave electromagnetic energy signals. In one embodiment an antenna 17 commonly termed a slot antenna is used as a microwave energy wave guide. Such a slot antenna 17 is shown in FIGS. 2A and 2B, which are respectively a front view and a side cross sectional view of a pad 13 containing the slot antenna. It is desirable that the pads 13 be of a relatively small size. This lessens the variance which might otherwise be caused by hole rugosity. It also increases the vertical resolution. In general terms, the overall dimensions of the pads 13 may be in the range of about three inches in width by five inches in length by one and one-half inches in thickness. The antenna 17 desirably has a horizontal width of about one-half the wavelength of the microwave energy to be used. In FIG. 2B there is shown a cross-sectional view of the pad 13 along the line A—A. A coaxial cable 21 is shown extending from the transmitting portion of the dipmeter as shown in FIG. 3 to the antenna 17. Also shown is a coaxial cable 22 extending from antenna 17 to the receiving portion of the dipmeter as shown in FIG. 3. The slot making up the antenna 17 would extend from the face of the antenna into the material of the pad 13 for a distance of about one-fourth of the microwave wavelength to be used.

With reference now to FIG. 3, there is shown an electronic circuit diagram of the transmitting and receiving systems associated with each of the antenna pads 13 of the microwave electromagnetic dipmeter. In this diagram three such transmitting and receiving systems are illustrated and designated as antenna systems 13A, 13B and 13C. As previously discussed, the dipmeter could be adapted with more than three antennas but three antennas are sufficient to obtain data indicative of the dip of subsurface formations penetrated by the borehole. A pulsed source 25 for generating selected microwave frequencies within the frequency range of 1 to 3 GHz is used in this microwave dipmeter. Such oscillators have been used in downhole equipment as is illustrated in U.S. Pat. No. 3,944,910 and U.S. Pat. No. 4,092,583, which patents are concerned with investigating earth formations surrounding a borehole and with determining the waterfilled porosity of formations surrounding a borehole. One pulsed source 25 is sufficient for the present dipmeter. This microwave energy from pulsed source 25 is applied to each of the three antenna systems 13A–13C. Since the transmitting and receiving circuitry associated with each such antenna system is identical, only the circuitry associated with the antenna system 13A is shown in detail and discussed in conjunction with such FIG. 3.

During the transmission period, the source 25 is pulsed to generate microwave energy within a selected frequency range of 1 to 3 GHz and desirably of a frequency of about 2 GHz. This frequency range has been selected so as to minimize signal losses in the formation at higher microwave frequencies and so as to minimize antenna size from that which would be required at lower microwave frequencies. This microwave energy is transmitted to a tuned power amplifier 27, and then through transmitting coaxial line 21 to antennas 13. The electromagnetic energy is transmitted via the antennas 13 into the subsurface earth formations penetrated by the borehole. During the reception period receiving coaxial line 22 routes electromagnetic energy signals received by the antennas 13 through the resistors 30, diodes 31, and diodes 32 to the tuned amplifiers 29. The signals from the tuned amplifier 29 is then passed to the amplitude detectors 33 for producing a signal proportional to the amplitude of the microwave energies received by the antenna 13. These signals, proportional to the received signal amplitudes may then be sent up the multiconductor logging cable to the earth's surface and recorded. The signals from the tuned amplifier 29 are also sent to phase detector 34, which determines the phase of the signals received by antennas 13 as compared to the phase of the signals produced by the pulsed source 25. The phase of the received signals may then be sent up the logging cable to the surface of the earth for recording. At the surface the amplitudes of the received signals from each of the antennas 13 are compared one to the other in a manner similar to that used by conventional induction or electrical dipmeters to determine the dip of the subsurface formations penetrated by the borehole. Likewise, the phase of the received signals may be compared one to the other to determine the dip of the subsurface formations. In logging boreholes, better results may be obtained in some cases using the amplitude comparison; while in others, better results may be obtained using the phase comparisons. For this reason it may be desirable to include both of these capabilities in the borehole dipmeter. One such method for determining dip from amplitude or phase measurements is described in the aforementioned reference in FORMATION EVALUATION by Edward J. Lynch. Although not shown, it will be understood that the borehole tool includes means for measuring and transmitting to the surface of the earth the direction and angle of inclination of the borehole for measuring the orientation of the tool relative to magnetic north and the size of the borehole.

In a preferred mode of operation, the source 25 is pulsed in the order of 20 times per second. During the transmission period, the transmitted electromagnetic energy is sufficient to cause voltage breakdown of the pair of diodes 31 and 32, thereby short circuiting the input to the tuned amplifier 29. The diodes are connected back-to-back in parallel fashion such that diode 31 breaks down under high energy level, positive going cycles of the microwave energy signals while diode 32 breaks down under high energy level, negative going cycles of the microwave energy signals. In this manner, the electromagnetic energy transmitted through transmitting coaxial line 21 cannot be picked up by the receiving coaxial line 22 and applied to the input of the tuned amplifier 29 in the receiving portion of the antenna system during the transmission period. During the reception period, the electromagnetic energy received from the formations surrounding the borehole is much lower and is insufficient to cause voltage breakdown of the diodes 31 and 32, thereby permitting the received energy to be applied to the input of tuned amplifier 29. In one embodiment, these diodes are Hewlett-Packard 5082-HSCH-5017 high frequency diodes with a breakdown voltage of about 300 millivolts. It can be therefore seen that the pair of diodes 31 and 32 function as an electronic switch which responds to the high energy of the electromagnetic energy transmission signals to disable the input to the receiving circuitry during the transmission period and responds to the low energy of the electromagnetic energy received signals from the earth formations to enable the input to the receiving circuitry during the reception period.

Having now described the present invention in connection with a preferred embodiment, it is to be understood that various modifications and changes may be made without departing from the spirit and scope of the invention as set forth in the appended claims.

I claim:

1. A microwave electromagnetic logging tool for use in the determination of the dip of subsurface earth formations surrounding a borehole, comprising:
   a. a borehole logging tool adapted for movement through a borehole, at least three microwave antennas positioned from the longitudinal axis of said tool and spaced approximately equally around said axis,
   b. a source of pulsed positive and negative going microwave energy,
   c. microwave transmitting means for applying said pulsed microwave energy to said antennas during a plurality of transmission periods for irradiating the formations surrounding the borehole,
   d. microwave receiving means,
   e. switching means for inhibiting microwave energy being applied to said antennas during said transmission periods from also being applied to said microwave receiving means, and for enabling microwave energy being received by said antennas from said formations during a plurality of microwave reception periods to be applied to said receiving means, said switching means comprises a pair of high frequency diodes connected bacl-to-back in parallel across the input to said receiving means such that a first of said pair of diodes breaks down at the energy level of the transmitted microwave energy so as to operate as a short circuit to positive going microwave energy signals during said plurality of transmission periods and does not break down at the energy level of the received microwave energy so as to operate as an open circuit to microwave energy signals during said plurality of reception periods, while a second of said pair of diodes breaks down at the energy level of the transmitted microwave energy so as to operate as a short circuit to negative-going microwave energy signals during said plurality of transmission periods and does not break down at the energy level of the received microwave energy so as to operate as an open circuit to microwave energy signals during said plurality of reception periods, and
   f. means coupled to said microwave receiving means for utilizing the microwave energy received by said antennas in the determination of the dip of the formations surrounding the borehole.

2. The system of claim 1 wherein the break down voltage for each of said high frequency diodes is in the order of 300 millivolts.

3. The system of claim 1 wherein said microwave energy is in the range of 1.0 to 3.0 gigahertz.

* * * * *